United States Patent [19]
Itakura et al.

[11] 3,766,045
[45] Oct. 16, 1973

[54] ELECTROLYTIC CELL FOR ELECTROLYSIS OF SEA WATER

[75] Inventors: Tatsuo Itakura, Funabashi; Tetsuo Shoda, Ichikawa; Takashi Yamamoto, Kasukabe, all of Japan

[73] Assignee: Daiki Engineering Co., Ltd., Tokyo, Japan

[22] Filed: Aug. 31, 1971

[21] Appl. No.: 176,486

[30] Foreign Application Priority Data
Sept. 8, 1970  Japan ....... 45/89243 (utility model)

[52] U.S. Cl. ................. 204/275, 204/149, 204/270, 204/278
[51] Int. Cl. ............................................. B01k 3/00
[58] Field of Search .................. 204/149, 278, 270, 204/275, 95

[56] References Cited
UNITED STATES PATENTS

| | | | |
|---|---|---|---|
| 3,645,880 | 2/1972 | Ueda | 204/278 |
| 3,458,414 | 7/1969 | Crane et al. | 204/278 |
| 3,476,675 | 11/1969 | Colvin et al. | 204/278 |
| 3,539,486 | 11/1970 | Fleck | 204/95 |

Primary Examiner—John H. Mack
Assistant Examiner—W. I. Solomon
Attorney—William T. Hough et al.

[57] ABSTRACT

An electrolytic cell for direct electrolysis of sea water wherein the cathode plates are parallelly elongated upward and downward longer than the anode plates to prevent $Mg(OH)_2$ from adhering to said cathode plates and further prevent impurities from depositing in the cell to increase the efficiency of the electrolysis. The cell includes a feed chamber below the electrolysis chamber, and an electrolyte takeoff-precipitate withdrawal chamber directly above the electrolysis chamber, with the outlet port from the electrolysis chamber coincident with the inlet port to the electrolyte takeoff-precipitate removal chamber.

1 Claim, 3 Drawing Figures

INVENTORS
TATSUO ITAKURA,
TETSUO SHODA, +
TAKASHI YAMAMOTO
By Laforest S. Saulsbury
ATTORNEY

ELECTROLYTIC CELL FOR ELECTROLYSIS OF SEA WATER

This invention relates to an electrolytic cell for direct electrolysis of sea water which permits of no adhesion and deposition of such impurities as magnesium hydroxide on the electrodes and the cell wall.

The concentration of chlorine ion in sea water is as dilute as about 19 g/l, but a considerable amount of sulfate ion is contained therein. Usually, the discharge rate of the chlorine ion on the graphite anode which is in use for electrolysis of common salt is less than 20 percent owing to the overvoltage thereof, and the balance is the discharge of sulfate and hydroxyl ions to cause considerable consumption of the graphite anode. Thus, the graphite is impracticable for anode. As a countermeasure thereto an electrode plated with platinum has been adopted and the discharge rate of the chlorine ion now reaches more than 80 percent for the effective electrolysis. Thus, the problem of the anode material in the direct electrolysis of sea water has been solved by using a platinum-plated electrode. However, there is still another cause which makes it difficult to put the direct electrolysis of sea water to industrial use. That is, impurities contained in sea water, particularly magnesium ion reacts with caustic soda which is produced on the cathode to adhere thereon as magnesium hydroxide or to be accumulated within the electrolytic cell, and as a result a flowing of the electrolyte is prevented, and also the current efficiency is decreased. Furthermore, as the amount of the magnesium hydroxide adhering on the cathode becomes larger, such a state is occurred that the spaces between the electrodes in the electrolytic cell are blocked up, and there is the disadvantage to make difficult a continuous operation thereof for long period.

Now, the present invention has overcome the disadvantages as above. That is, the subject matter of the present invention resides in that in an electrolytic cell for direct electrolysis of sea water to produce hypochlorous acid, hypochlorite or chlorine, the cathode plates which are elongated upward and downward longer than and parallelly to the anodes plates are provided to prevent adhesion on the cathode plate of the magnesium hydroxide which is converted from the magnesium ion in sea water, and to continuously flow out the impurities which are accumulated within the cell, whereby generation of turbulence of the flowing liquid is suppressed and the efficiency of the electrolysis is increased.

In order that the invention may be more clearly understood, the cell according to the present invention will be described with reference to the accompanying drawings.

Figure 1:
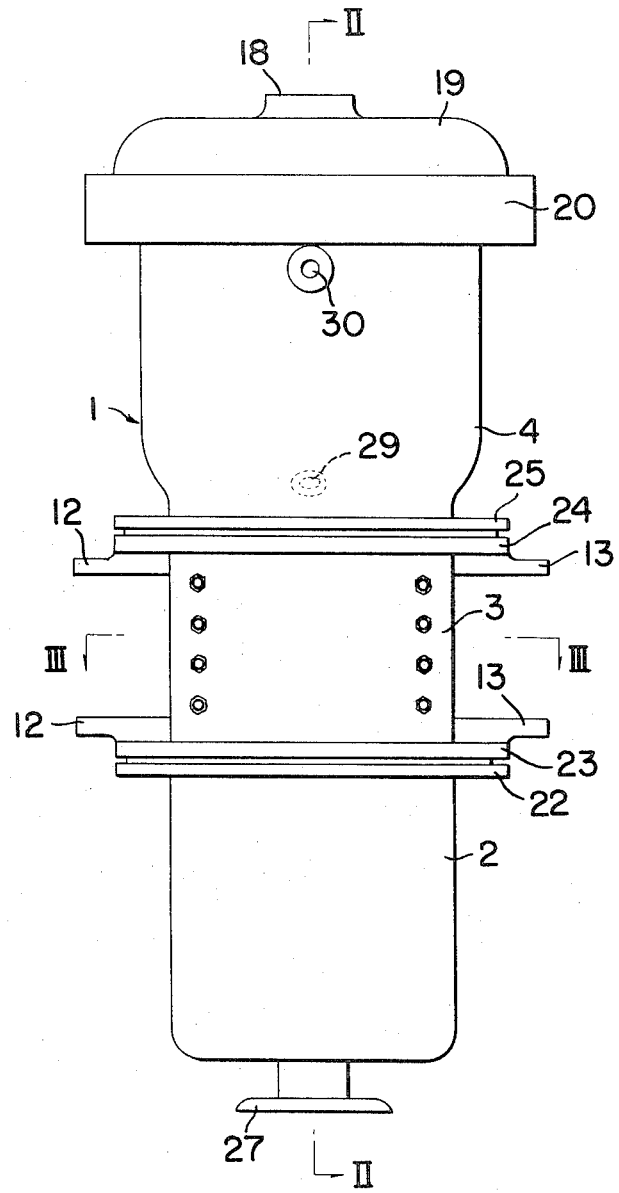
FIG. 1 shows a front view of the electrolytic cell for direct electrolysis of sea water according to the present invention.
Figure 2:
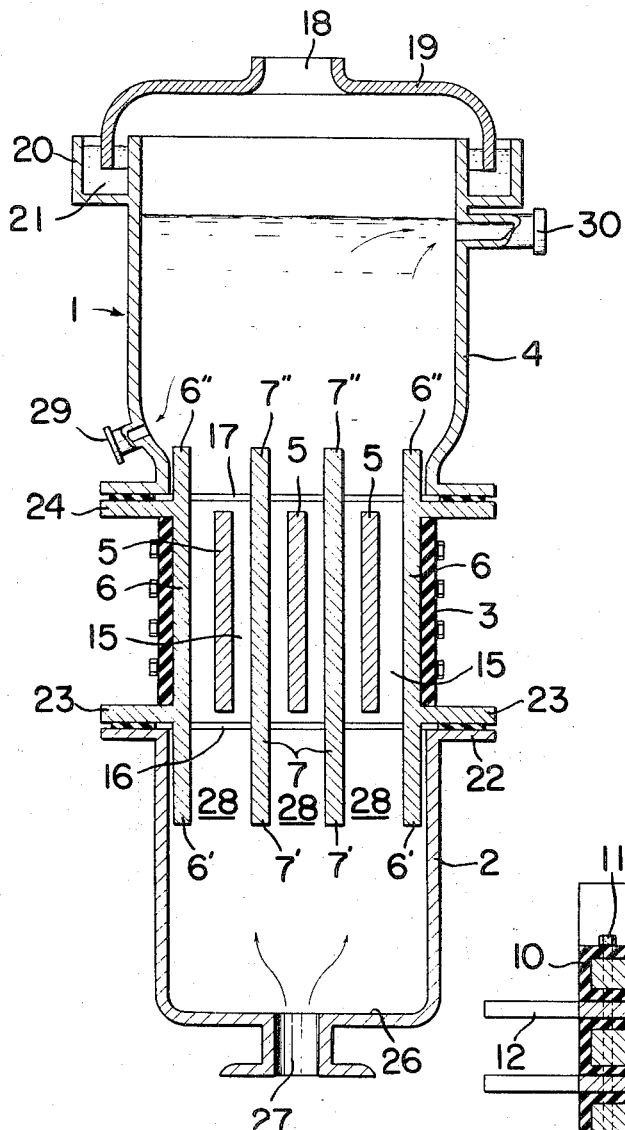
FIG. 2 shows a longitudinal section along line II — II in FIG. 1.
Figure 3:
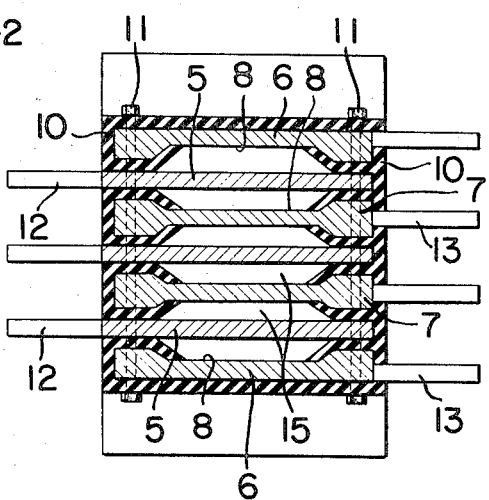
FIG. 3 shows a cross-sectional view along line III — III on the electrode portion shown in FIG. 1.

In FIG. 1 main body of the electrolytic cell is preferably square shape, but it may be formed to a cylindrical, ellipsoid or polygonal shape and is constructed of electrolyte-feeding chamber 2, electrolysis chamber 3 and electrolyte-separating and -exhausting chamber 4 from the lower stage to upper one in order. These chambers are connected each other by flanges 22, 23, 24 and 25. The lower electrolyte-feeding chamber 2 is connected with liquid-feeding pipe 27, and, as shown in FIG. 2, within said chamber the lower ends 6' and 7' of the cathode plates 6 and 7, respectively, which are provided in the electrolysis chamber 3 with a definite interval are suspended so as not to be reached to the bottom 26 thereof, the space between them constitutes the passage of the electrolyte. Within the electrolysis chamber 3 on the electrolyte-feeding chamber 2, two cathode plates 6 having flanges 23 and 24 are placed at the both sides thereof, and as shown in FIG. 3, inner cathode plates 7 are present inside the cathode plates 6. The peripheral surfaces excepting the inside concaves 8 of the cathode plates 6 and 7 are coated with an electrically nonconducting material 10, the anode plates 5 made of a flat plate are inserted and held between the cathode plates 6 and 7 to combine the cathode and anode plates alternatively and parallelly, and the side parts thereof are bound securely with insulated bolts 11 to form the opened portion 15 therebetween. The terminals 12 and 13 are projectingly mounted on the sides of the anode plate 5 and the cathode plates 6 and 7, respectively. As shown in FIG. 2, on the upper and lower portions of the side of the electrolysis chamber 3, there are supporting plates 16 and 17 holding the anode plates 5 and the cathode plates 7. The upper ends 6'' and 7'' of the cathode plates 6 and 7, respectively, are projected into the inside of the electrolyte-exhausting chamber 4. As the anode and cathode plates are parallelly arranged at a definite interval, the liquid is smoothly flowed.

The chamber 4 from which gas, reaction products and sludge are produced by the electrolysis are respectively separated and exhausted is in slightly inflatedly formed as compared with the other portions. A sludge-exhausting outlet 29, electrolyte-exhausing opening 30 and receiving groove 20 for being provided with a lid 19 having a gas-exhausting hole 18 are provided to the lower portion, upper side and upper periphery of the electrolyte-separating and exhausting chamber 4, respectively, and after the liquid 21 is contained in the receiving groove, the periphery of the lid 19 is sealed closely. The anode plate 5 in the body 1 of the electrolytic cell consists of titanium, and its electrolyzing face is plated with platinum. The cathode plates 6 and 7 are made of steel or chromized steel plate.

In the electrolytic cell according to the present invention, sea water is flowed from the electrolyte-feeding pipe 27 into the electrolyte-feeding chamber 2, and the sea water is sufficiently put in order due to standing in regular order of the lower end 7' of the cathode plates 7 and further is sent into the electrolysis chamber 3 through the passages 28. Hanging of the lower end of the cathode plates into the electrolyte-feeding chamber 2 causes sufficient putting in order of the feed liquid flowing within the chamber, forming a state convenient to the electrolysis, i.e. developing a lifting stream as streamline flow between the anode and cathode plates within the electrolytic chamber. A velocity of flow of the streamline flow is desirable to be approximately 10 − 50 cm/sec, and when the Reynolds number between the electrodes may be established to 300 − 350, the stream of the electrolyte can always be lifted between the electrodes in a state of streamline flow, so that the requisite in the electrolysis may be statisfied. When the electrolysis may be carried out by lifting the stream between the electrodes in a state of putting in order stream, the components formed on the cathode and anode plates are not reacted between the electrodes but rapidly sent as they are to the upside electrolyte-separating and exhausting chamber 4. As the upper ends 6'' and 7'' of the cathode plates 6 and 7, respectively, rise perpendicularly and parallelly within said chamber, the stream is lifted without hinderance, and the cathode and anode liquid within said chamber are sufficiently admixed to carry out the reaction thereof effectively.

According to the present invention, the magnesium ion in sea water is, as described hereinbefore, converted into magnesium hydroxide particle by reacting the magnesium ion with the electrolytes within the upside electrolyte-separating and exhausting chamber 4, and the particle is exhausted from the outlet 29 as a sludge together with the electrolytes. Accordingly, impurities contained in the sea water do not adhere on the surfaces of the electrode plates and not block up the space between the plates so that such the advantage can be obtained that a continuous operation can be effected for a long period. Further, since there occurs no reaction within the space between the electrodes the current efficiency may be raised by about 2 – 3 percent, and the chlorine gas generated on the anode plates is sufficiently dissolved into the sea water and also is converted into hypochlorite ion. Thus, the chlorine gas is almost not contained in the hydrogen gas generated on the cathode plate simultaneously, so that such danger as explosion can be prevented and thus a safetiness is also increased.

When the direct electrolysis is carried out, an amount to adhere on the cathode plates of magnesium hydroxide which is formed by the reaction of magnesium ion in the sea water with caustic soda becomes larger as the velocity of flow of the electrolyte lifting between the electrodes is lower. Accordingly, adhesion of magnesium hydroxide on the cathode plate must be avoided as much as possible by raising the lifting velocity of the electrolyte stream.

According to the present invention the cathode plates 6 and 7 are projected from the electrolyte-feeding chamber 2 into the electrolyte-exhausing chamber 4 through the electrolysis chamber 3, so that they act just as a funnel, making stream rising smooth without retention of the electrolyte. Thus, impurities do not adhere on the electrodes and the walls of the cell, the electrolyte is rised in a state of streamline flow between the electrodes, and it is not reacted within the space between the electrodes but reacted within the exhausing chamber imediately after being discharged from said space and therefore the electrolytic effect being extremely raised.

What we claim is:

1. An electrolytic cell for electrolysis of sea water comprising in combination: structure defining in consecutive flow series an electrolyte-feeding chamber including an inlet port and an outlet port, an electrolysis chamber in flow series with the outlet port of the electrolyte-feeding chamber and having an electrolysis chamber outlet port, the electrolysis chamber being located above the electrolyte-feeding chamber and the outlet port of the electrolyte-feeding chamber for upward flow of electrolyte from the electrolyte-feeding chamber upwardly through the electrolysis chamber, and a precipitate-withdrawal gas-exhaust electrolyte-takeoff upper-chamber having a lower intake port coincident and continuous with the electrolysis chamber outlet port channeling continued upward flow through the upper-chamber and having located in flow series a lower precipitate-withdrawal port, a lateral upper electrolyte-takeoff port and an upper exhaust port, the upper-chamber being in electrolyte flow series with and above the outlet port of the electrolysis chamber; within the electrolysis chamber, both cathode plates and anode plates about alternately intersperced with one-another and with opposing faces of said one-another spaced apart a predetermined distance and about parallel to one-another defining channel therebetween aligned lineally with electrolyte upward flow from the lower electrolyte-feeding chamber toward the upper precipitate-withdrawal gas-exhaust electrolyte-takeoff chamber, the cathode plates being extended beyond the anode plates' ends and into each of said lower electrolyte-feeding chamber and said upper-chamber; and means for electrolytically electrifying said cathode plates and said anode plates.

* * * * *